(12) United States Patent
Liu

(10) Patent No.: US 10,843,697 B2
(45) Date of Patent: Nov. 24, 2020

(54) VIBRATION DAMPING CONTROL APPARATUS FOR VEHICLE

(71) Applicant: TOYOTA JIDOSHA KABUSHIKI KAISHA, Toyota (JP)

(72) Inventor: Yanqing Liu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 16/039,850

(22) Filed: Jul. 19, 2018

(65) Prior Publication Data

US 2019/0023274 A1 Jan. 24, 2019

(30) Foreign Application Priority Data

Jul. 20, 2017 (JP) .................................. 2017-141102

(51) Int. Cl.
| | |
|---|---|
| *B60W 30/20* | (2006.01) |
| *B60T 8/171* | (2006.01) |
| *B60W 40/11* | (2012.01) |
| *B60T 8/1755* | (2006.01) |

(Continued)

(52) U.S. Cl.
CPC ............. *B60W 30/20* (2013.01); *B60T 8/171* (2013.01); *B60T 8/17551* (2013.01); *B60T 8/17555* (2013.01); *B60W 40/11* (2013.01); *B60L 3/102* (2013.01); *B60L 2240/441* (2013.01); *B60L 2240/461* (2013.01); *B60L 2270/145* (2013.01); *B60T 2260/06* (2013.01); *B60W 10/04* (2013.01)

(58) Field of Classification Search
CPC ............. B60T 8/17551; B60T 8/17555; B60T 2260/06; B60W 40/11; B60W 10/04; B60W 10/06; B60L 2240/441; B60L 2240/461

See application file for complete search history.

(56) References Cited

U.S. PATENT DOCUMENTS 8,423,264 B2 * 4/2013 Itabashi ................ F02D 41/021
701/104
2006/0052908 A1 3/2006 Matsumoto et al.
(Continued)

FOREIGN PATENT DOCUMENTS

| JP | 2012-046037 A | 3/2012 |
|---|---|---|
| JP | 2012-91596 A | 5/2012 |

(Continued)

*Primary Examiner* — Michael J Zanelli
(74) *Attorney, Agent, or Firm* — Sughrue Mion, PLLC

(57) ABSTRACT

A vibration damping control apparatus which has a control unit that calculate a pitch damping driving torque based on a pitch angular velocity of a vehicle body, and control an engine based on at least the pitch damping driving torque. The control unit stores a vehicle speed corresponding to a phase difference of −180° in a relationship between a phase difference and a vehicle speed as an upper limit reference vehicle speed, the relationship being derived by obtaining phase characteristic of a wheelbase filter function for various vehicle speeds and obtaining a relationship between the phase difference of vertical displacements of the vehicle body at positions of front and rear wheels and a vehicle speed with respect to a pitch resonance frequency of the vehicle, and reduces the pitch damping driving torque when a vehicle speed is not higher than the upper limit reference vehicle speed.

7 Claims, 11 Drawing Sheets

(51) Int. Cl.
*B60L 3/10* (2006.01)
*B60W 10/04* (2006.01)

(56) References Cited

U.S. PATENT DOCUMENTS

| | | | |
|---|---|---|---|
| 2011/0137514 A1* | 6/2011 | Itabashi | B60W 10/06 |
| | | | 701/31.4 |
| 2011/0202235 A1* | 8/2011 | Oikawa | B60W 30/20 |
| | | | 701/36 |
| 2011/0266760 A1 | 11/2011 | Itabashi | |
| 2012/0099849 A1 | 4/2012 | Onishi et al. | |
| 2012/0179332 A1* | 7/2012 | Harima | F02D 41/1498 |
| | | | 701/37 |
| 2012/0303243 A1* | 11/2012 | Momose | F02D 11/105 |
| | | | 701/102 |
| 2013/0166165 A1* | 6/2013 | Murata | B60W 10/10 |
| | | | 701/70 |
| 2013/0231838 A1 | 9/2013 | Shiozawa et al. | |

FOREIGN PATENT DOCUMENTS

| | | |
|---|---|---|
| JP | 2006-69472 A | 3/2016 |
| WO | 2010/050070 A1 | 5/2010 |

\* cited by examiner

VIBRATION DAMPING CONTROL APPARATUS FOR VEHICLE

CROSS-REFERENCE TO RELATED APPLICATION

The disclosure of Japanese Patent Application NO. JP2017-141102 filed on Jul. 20, 2017 is incorporated by reference in its entirety.

BACKGROUND

1. Technical Field

The present disclosure relates to a vibration damping control apparatus for a vehicle such as an automobile.

2. Description of the Related Art

When a vehicle such as an automobile travels, a vehicle body vibrates at or near a sprung resonance frequency (for example, 1.5 Hz) due to disturbance input to the vehicle from a road surface via wheels, acceleration/deceleration operation by a driver, or the like. This vibration of the vehicle body (also called sprung vibration) includes a component in a pitch direction (pitch vibration) about a lateral axis passing through a center of gravity of the vehicle and a component in a vertical direction at the center of gravity position of the vehicle (bounce vibration).

As a control device for reducing sprung vibration, for example, as described in Japanese Patent Application Laid-open Publication No. 2006-69472, a vibration damping control device has been known that calculates a damping driving force acting in a direction to suppress vibration of a vehicle body and controls a driving force of the vehicle based on a sum of a required driving force required by a driver and the damping driving force. Further, as described in Japanese Patent Application Laid-Open Publication No. 2012-46037, it is also known that a pitch angular velocity and a bounce velocity of a vehicle body are calculated based on wheel speeds of wheels, and a vibration damping driving force is calculated based on the pitch angular velocity and the bounce velocity.

According to a vibration damping control device for controlling a driving force of a vehicle, a vibration damping driving force acting in the direction of suppressing the vibration of a vehicle body can be given to the vehicle. Therefore, it is possible to reduce a vibration of a vehicle body such as a pitch vibration, and it is possible to improve ride comfort of a vehicle as compared to where no vibration suppression driving force is given to a vehicle.

When pitch vibration damping is performed by applying vibration damping driving force to a vehicle, ride comfort of the vehicle may decrease in a relatively low vehicle speed range. Therefore, by not carrying out the pitch damping control in a particular vehicle speed range, deterioration of ride comfort of a vehicle can be avoided. However, since a vehicle speed range in which ride comfort of a vehicle decreases depends on specifications of the vehicle, it is necessary to perform running tests for each vehicle type to determine a vehicle speed range in which the vehicle runs at various vehicle speeds and ride comfort deteriorates. There are individual differences in judging whether ride comfort deteriorates or not. Therefore, in order to specify a particular vehicle speed range, much time and labor are required.

The inventor of the present disclosure conducted intensive studies to solve, without requiring running tests, the problem that ride comfort of a vehicle deteriorates in a relatively low vehicle speed range when pitch vibration damping is performed. As a result, the followings were found out.

(1) Bounce vibration of a vehicle deteriorates when a phase difference between vertical displacements of a vehicle body at positions of front and rear wheels, that is, a phase difference of a vertical displacement of the vehicle body at the position of rear wheels with respect to a vertical displacement of the vehicle body at the position of front wheels is −180° or a value smaller by a predetermined value than −180°.

(2) There is a certain relationship determined by the specifications of a vehicle between a range of a phase difference in which a bounce vibration of a vehicle deteriorates and the corresponding vehicle speed range.

(3) Since a range of a phase difference in which a bounce vibration of a vehicle deteriorates is determined by a wheelbase of the vehicle and a pitch resonance frequency, a vehicle speed range corresponding to the range of the phase difference where the bounce vibration of the vehicle deteriorates, that is, a particular vehicle speed range is also determined by a wheelbase and a pitch resonance frequency of the vehicle.

(4) Since a wheelbase and a pitch resonance frequency of a vehicle are determined by the specifications of the vehicle, a particular vehicle speed range can be determined based on the specification of the vehicle. Therefore, it is possible to determine a particular vehicle speed range without requiring running tests, and, by reducing a control amount of pitch damping in the determined particular vehicle speed range, it is possible to reduce deterioration of ride comfort of the vehicle caused by a deterioration of a bounce vibration in the particular vehicle speed range.

SUMMARY

The present disclosure provides a vibration damping control apparatus improved to solve the problem of deterioration of ride comfort of a vehicle in a relatively low vehicle speed range without requiring running tests based on the above findings (1) to (4) obtained by the research of the inventor of the present disclosure.

According to one embodiment of the present disclosure, a vibration damping control apparatus for a vehicle is provided which is applied to a vehicle including a driving force generating device that generates a driving force of the vehicle and a control unit that controls the driving force generating device, the control unit being configured to calculate a driver-requiring driving force based on a driving operation amount of a driver, calculate a pitch angular velocity of a vehicle body, calculate a pitch damping driving force for reducing a pitch vibration of the vehicle body based on the pitch angular velocity, and control the driving force generating device based on a sum of the driver-requiring driving force and the pitch damping driving force.

The control unit stores a vehicle speed corresponding to a phase difference of −180° in a relationship between a phase difference and a vehicle speed as an upper limit reference vehicle speed, the relationship being derived by obtaining phase characteristic of a wheelbase filter function with a wheelbase and a vehicle speed of the vehicle as variables for various vehicle speeds and obtaining, based on the phase characteristic, a relationship between the phase difference of vertical displacements of the vehicle body at positions of front and rear wheels and a vehicle speed with respect to a pitch resonance frequency of the vehicle, and the control unit is configured to reduce the pitch damping driving force for correction when a vehicle speed is equal to or lower than the upper limit reference vehicle speed.

According to the above configuration, a relationship between a phase difference of vertical displacements of a vehicle body at positions of front and rear wheels and a vehicle speed is obtained with respect to a pitch resonance frequency of a vehicle based on phase characteristic of a wheelbase filter function, and a vehicle speed corresponding to a phase difference of −180° in the relationship between a phase difference and a vehicle speed is stored as an upper limit reference vehicle speed. A pitch damping driving force is reduced for correction when a vehicle speed is equal to or lower than the upper limit reference vehicle speed.

As will be described in detail later, phase characteristic of a wheelbase filter function and a pitch resonance frequency of a vehicle are determined by the specifications of the vehicle, so that it is possible to obtain the phase characteristic of the wheelbase filter function and the pitch resonance frequency of the vehicle based on the specifications of the vehicle. Therefore, the upper limit reference vehicle speed can be obtained based on the specifications of the vehicle without requiring running tests, thus without requiring a lot of time and labor.

Further, as described in detail later, a particular vehicle speed range in which ride comfort of a vehicle is deteriorated due to deterioration of a bounce vibration varies depending on vehicle specifications. However, an upper limit of the particular vehicle speed range corresponds to a vehicle speed at which a phase difference between vertical displacements of a vehicle body at positions of front and rear wheels is −180° irrespective of the specifications of the vehicle. Therefore, the upper limit reference vehicle speed is an upper limit vehicle speed in the particular vehicle speed range where ride comfort of a vehicle is lowered due to deterioration of a bounce vibration regardless of the specifications of the vehicle.

According to the above configuration, when a vehicle speed is equal to or lower than the upper limit reference vehicle speed, deterioration of the bounce vibration is reduced by reducing the pitch damping driving force for correction. Therefore, it is possible to reduce deterioration of ride comfort of the vehicle caused by the deterioration of the bounce vibration in a relatively low vehicle speed range, without requiring running tests and irrespective of vehicle specifications.

In another embodiment of the present disclosure, a vibration damping control apparatus for a vehicle is provided which is applied to a vehicle including a driving force generating device that generates a driving force of the vehicle and a control unit that controls the driving force generating device, the control unit being configured to calculate a driver-requiring driving force based on a driving operation amount of a driver, calculate a pitch angular velocity of a vehicle body, calculate a pitch damping driving force for reducing a pitch vibration of the vehicle body based on the pitch angular velocity, calculate a bounce velocity of the vehicle body, calculate a bounce damping driving force for reducing a bounce vibration of the vehicle body based on the bounce velocity, and control the driving force generating device based on a sum of the driver-requiring driving force, the pitch damping driving force and the bounce damping driving force.

the control unit stores a vehicle speed corresponding to a phase difference of −180° in a relationship between a phase difference and a vehicle speed as an upper limit reference vehicle speed, the relationship being derived by obtaining phase characteristic of a wheelbase filter function with a wheelbase and a vehicle speed of the vehicle as variables for various vehicle speeds and obtaining, based on the phase characteristic, a relationship between the phase difference of vertical displacements of the vehicle body at positions of front and rear wheels and a vehicle speed with respect to a pitch resonance frequency of the vehicle, and the control unit is configured to increase the bounce damping driving force for correction when a vehicle speed is equal to or lower than the upper limit reference vehicle speed.

According to the above configuration, when a vehicle speed is equal to or lower than the upper limit reference vehicle speed, deterioration of the bounce vibration is reduced by increasing the bounce damping driving force for correction. Therefore, it is possible to reduce deterioration of ride comfort of the vehicle caused by the deterioration of the bounce vibration in a relatively low vehicle speed range, without requiring running tests and irrespective of vehicle specifications.

Notably, the "wheelbase filter function" is a function expressing a phase of a vertical displacement of a vehicle body at the position of rear wheels with respect to a vertical displacement of the vehicle body at the position of front wheels. The "phase characteristic of the wheelbase filter function" is a relationship between a frequency of a road surface input, a phase difference between vertical displacements of the vehicle body at the positions of the front and rear wheels and a vehicle speed.

In one aspect of the present disclosure, in the above another embodiment, the control unit is configured to reduce the pitch damping driving force for correction when a vehicle speed is equal to or lower than the upper limit reference vehicle speed.

According to the above aspect, when a vehicle speed is equal to or lower than the upper limit reference vehicle speed, not only the bounce damping driving force is increased for correction but also the pitch damping driving force is reduced for correction, which enables to reduce deterioration of the bounce vibration that is attributable to the pitch damping driving force being applied to the vehicle. Therefore, when a vehicle speed is equal to or lower than the upper limit reference vehicle speed, as compared to where the bounce damping driving force is increased for correction but the pitch damping driving force is not reduced for correction, deterioration in ride comfort can effectively be reduced.

Further, in another aspect of the present disclosure, in the above one embodiment, the control unit stores a vehicle speed corresponding to a phase that is smaller than −180° by a preset value in the relationship between a phase difference and a vehicle speed as a lower limit reference vehicle speed, and is configured to reduce the pitch damping driving force for correction when a vehicle speed is equal to or higher than the lower limit reference vehicle speed and is equal to or lower than the upper limit reference vehicle speed.

According to the above aspect, when a vehicle speed is equal to or higher than the lower limit reference vehicle speed and equal to or lower than the upper limit reference vehicle speed, the pitch damping driving force is reduced for correction. Therefore, when a vehicle speed is equal to or higher than the lower limit reference vehicle speed and is equal to or lower than the upper limit reference vehicle speed, the decrease in ride comfort of the vehicle caused by the deterioration of the bounce vibration can be reduced, and when a vehicle speed is lower than the lower limit reference vehicle speed, the pitch vibration can effectively be reduced by the pitch damping driving force which is not reduced.

Further, in another aspect of the present disclosure, in the above another embodiment, the control unit stores a vehicle speed corresponding to a phase that is smaller than −180° by a preset value in the relationship between a phase difference and a vehicle speed as a lower limit reference vehicle speed, and is configured to reduce the pitch damping driving force for correction when a vehicle speed is equal to or higher than the lower limit reference vehicle speed and is equal to or lower than the upper limit reference vehicle speed.

According to the above aspect, the bounce damping driving force is not only increased for correction when a vehicle speed is equal to or lower than the upper limit reference vehicle speed, but also the pitch damping driving force is reduced for correction when a vehicle speed is equal to or higher than the lower limit reference vehicle speed and is equal to or lower than the upper limit reference vehicle speed. Therefore, when a vehicle speed is equal to or higher than the lower limit reference vehicle speed and is equal to or lower than the upper limit reference vehicle speed, the deterioration in ride comfort of the vehicle caused by the deterioration of the bounce vibration can be reduced, and when a vehicle speed is lower than the lower limit reference vehicle speed, the pitch vibration can effectively be reduced by the pitch damping driving force which is not reduced.

Further, in another aspect of the present disclosure, the control unit is configured to reduce the pitch damping driving force for correction to zero.

According to the above aspect, the pitch damping driving force is reduced for correction to zero. Therefore, it is possible to effectively reduce the deterioration of the bounce vibration caused by the pitch damping driving force being applied In the vehicle, as compared to where the pitch damping driving force is reduced for correction to a value larger than zero.

Further, in another aspect of the present disclosure, the control unit is configured to control the bounce damping driving force to zero when a vehicle speed is higher than the upper limit reference vehicle speed and In increase the bounce damping driving force for correction to a value larger than zero when a vehicle speed is equal to or lower than the upper limit reference vehicle speed.

According to the above aspect, when a vehicle speed exceeds the upper limit reference vehicle speed, the bounce damping driving force is controlled to be zero. Therefore, as compared to where the bounce damping driving force is controlled to a value larger than zero when a vehicle speed exceeds the upper limit reference vehicle speed, the pitch damping effect obtained by the pitch damping driving force being applied to the vehicle can be increased. Furthermore, since the bounce damping driving force is given to the vehicle when a vehicle speed is equal to or lower than the upper limit reference vehicle speed, the bounce vibration of the vehicle can be reduced as compared to where no bounce damping driving force is given to the vehicle.

Other objects, other features and attendant advantages of the present disclosure will be readily understood from the description of the embodiments of the present disclosure described with reference to the following drawings.

DETAILED DESCRIPTION

Figure 1:
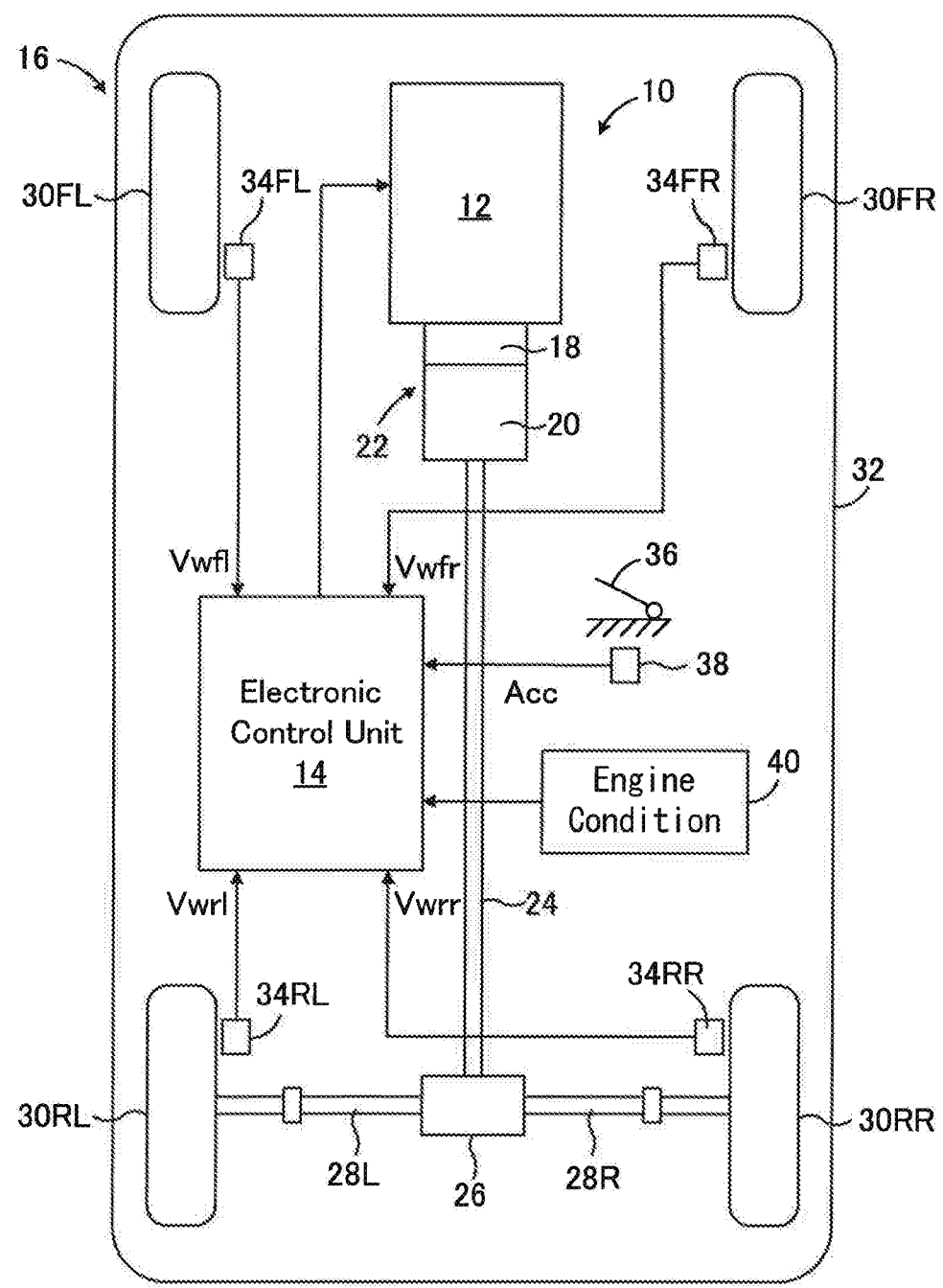
FIG. 1 is a schematic configuration diagram showing a first embodiment of a vibration damping control apparatus for a vehicle according to the present disclosure.

Some preferred embodiments of the present disclosure will now be described in detail with reference to the accompanying drawings. It is to be noted that "driving torque" in the embodiments corresponds to "driving force" in the claims.

First Embodiment

The vibration damping control apparatus 10 is applied to a vehicle 16 including an engine 12 as a driving force generating device for generating a driving force of the vehicle and an electronic control unit 14 as a control device for controlling the engine 12. A driving force of the engine 12 is transmitted to a propeller shaft 24 via an automatic transmission 22 including a torque converter 18 and a gear type transmission mechanism 20. Notably the transmission may be a CVT (continuously variable transmission). In the following descriptions, the electronic control unit is abbreviated as ECU.

The driving force of the propeller shaft 24 is transmitted to a left rear wheel axle 28L and a right rear wheel axle 28R by a differential 26 so that left and right rear wheels 30RL and 30RR which are driving wheels are rotationally driven. Left and right front wheels 30FL and 30FR of the vehicle 16 are driven wheels and steered wheels, and although not shown in FIG. 1, the wheels are steered through tie rods by a rack and pinion type power steering apparatus driven in response to steering of a steering wheel by a driver. Further, braking forces of the left and right front wheels 30FL, 30FR and the left and right rear wheels 30RL, 30RR are controlled by a braking device not shown in FIG. 1 according to the driver's braking operation amount.

Notably, the engine 12 may be either a gasoline engine or a diesel engine. Although the vehicle 16 shown in FIG. 1 is a rear wheel drive vehicle, the vehicle to which the vibration damping control apparatus 10 is applied may be a front wheel drive vehicle or a four wheel drive vehicle. Furthermore, the vehicle to which the vibration damping control apparatus 10 is applied may be an electric vehicle in which a driving force generating device is an electric motor, a hybrid vehicle in which a driving force generating device is a combination of an engine and an electric motor, or a fuel cell vehicle in which a driving force generating device is a combination of a fuel cell and electric motors.

Although not shown in FIG. 1, the left and right front wheels 30FL, 30FR and the left and right rear wheels 30RL, 30RR are suspended from a vehicle body 32 by corresponding suspensions. The left and right front wheels 30FL, 30FR and the left and right rear wheels 30RL, 30RR are provided with wheel speed sensors 34FL to 34RR, respectively, for detecting wheel speeds Vwi (i=FL, FR, RL and RR), which are rotational angular velocities or rotational circumferential speeds of the corresponding wheels. An accelerator pedal 36 operated by the driver is provided with an accelerator opening degree sensor 38 for detecting an accelerator opening degree Acc as a value indicating a driving operation amount of the driver. Signals indicating the wheel speeds Vwi and a signal indicating the accelerator opening degree Acc are input to the ECU 14.

The engine 12 is provided with an engine condition sensor 40. The engine condition sensor 40 includes a plurality of sensors for detecting states of the engine 12 and the transmission 22, and signals indicating detection values by the sensors are input to the ECU 14. For example, the engine condition sensor 40 detects an engine rotation speed, a cooling water temperature, an intake air temperature, an intake air pressure, an atmospheric pressure, a throttle opening degree, a shift gear stage, and the like. The ECU 14 adjusts a driving torque of the engine 12 by operating an actuator (not shown) based on signals input from these sensors.

Figure 2:
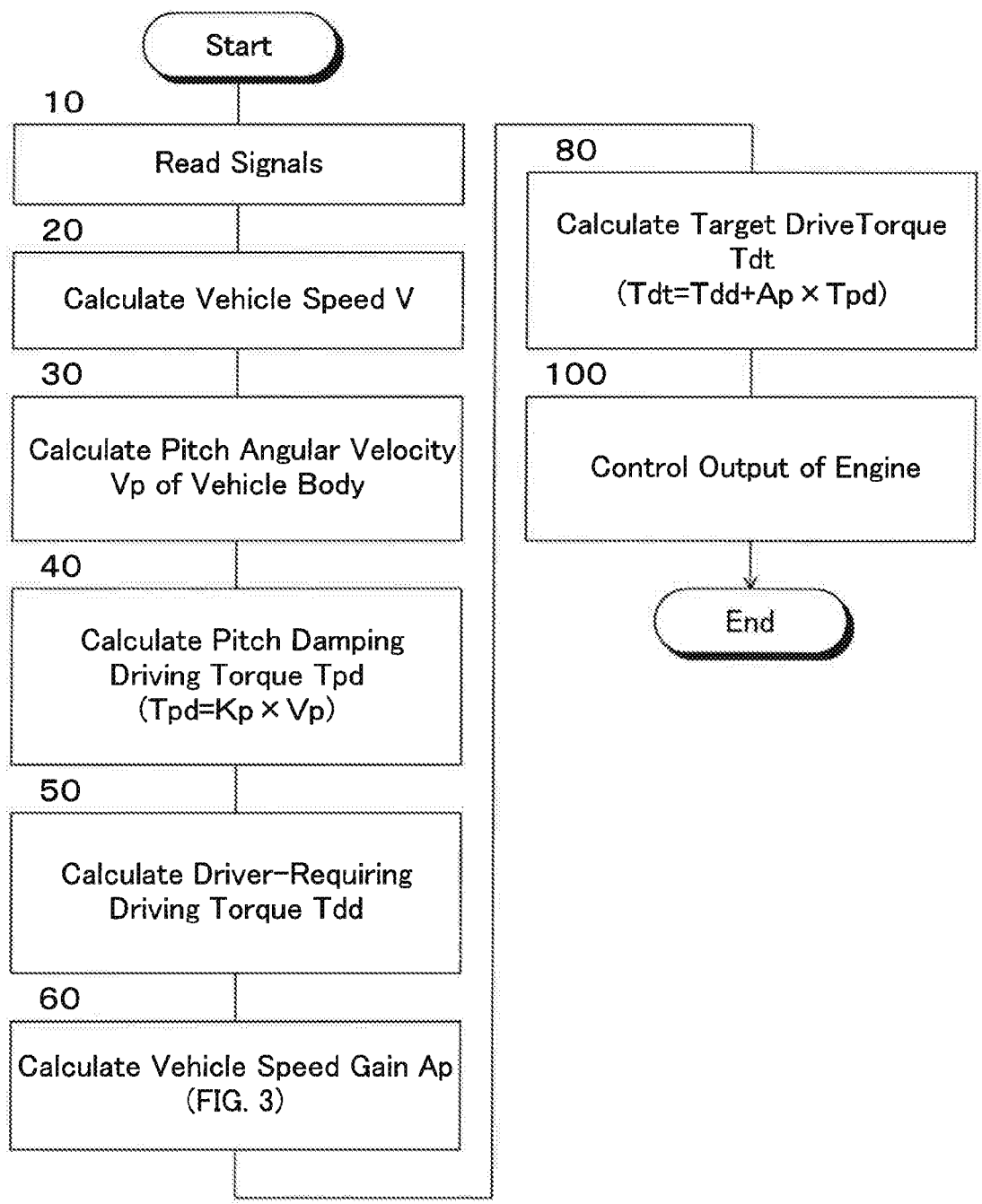
FIG. 2 is a flowchart showing a vibration damping control routine for a vehicle according to the first embodiment.

As will be described in detail later, the ECU 14 executes vibration damping control of the vehicle in accordance with a control program corresponding to the flowchart shown in FIG. 2. The ECU 14 may be a microcomputer having a CPU, a ROM, a RAM, and an input/output port device that are mutually connected by a bidirectional common bus. The control program corresponding to the flow chart shown in FIG. 2 are stored in the ROM, and the CPU executes the vibration damping control in accordance with the control program. The map shown in FIG. 3 to be described later is also stored in the ROM.

Next, the vibration damping control of the vehicle executed by the ECU 14 will be described. When a disturbance acts on the wheels due to unevenness of a road surface or the like while the vehicle 16 is traveling, the disturbance is transmitted to the vehicle body 32 via the suspensions. Therefore, the vehicle body 32 vibrates in the vicinity of a sprung resonance frequency. As described above, vibration of the vehicle body 32 (sprung vibration) includes a pitch vibration and a bounce vibration.

The vibration damping control of the vehicle is a control for reducing a pitch vibration and a bounce vibration of the vehicle body 32, particularly the pitch vibration. For example, as described in Japanese Patent Application Laid-Open Publication No. 2012-46037, a degree of pitch vibration and a degree of bounce vibration of the vehicle body can be determined by a pitch angular velocity and a bounce velocity of the vehicle body calculated based on wheel speeds of the wheels. Furthermore, a pitch vibration and a bounce vibration can be reduced by controlling a driving torque of the engine 12 based on a pitch angular velocity and a bounce velocity of the vehicle so as to vary driving forces of the drive wheels so that a pitch vibration reducing force and a bounce vibration reducing force act on the vehicle.

In particular, in the first embodiment, the ECU 14 calculates, based on a pitch angular velocity Vp of the vehicle, a pitch damping driving torque Tpd for exerting a force for reducing a pitch vibration to the vehicle. The ECU 14 calculates a driver-requiring driving torque Tdd which is a driving torque of the vehicle requested by the driver, and sets a sum of the pitch damping driving torque Tpd and the driver-requiring driving torque Tdd to a target driving torque Tdt of the vehicle. Further, the ECU 14 controls the driving torque of the engine 12 so that a driving torque of the vehicle becomes the target driving torque Tdt.

Furthermore, in the first embodiment, the ECU 14 calculates a vehicle speed V based on wheel speeds Vwi, and when the vehicle speed V is equal to or lower than an upper limit reference vehicle speed Vrh (a positive constant), the ECU 14 sets the pitch damping driving torque Tpd to zero. The upper limit reference vehicle speed Vrh is obtained by the following procedures (A) to (E) and stored in the ROM of the microcomputer of the ECU 14.

Figure 4:
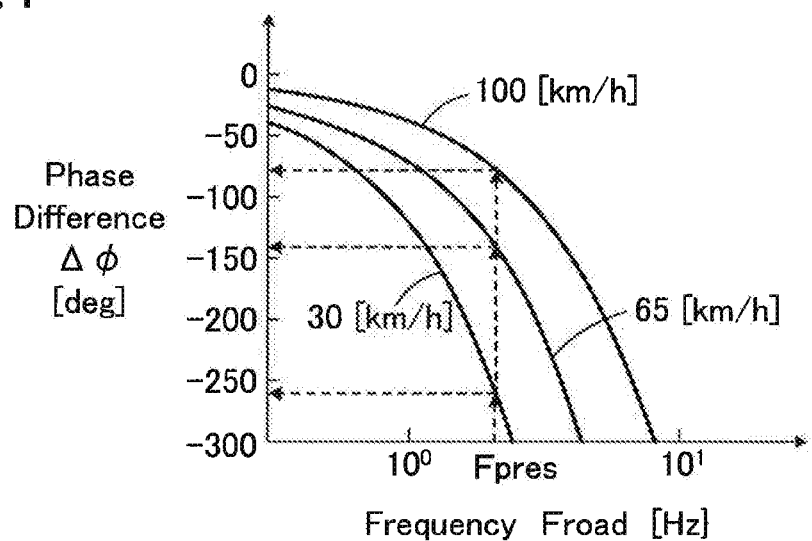
FIG. 4 is a graph showing a relationship among a road surface input frequency Froad, a phase difference Δφ between vertical displacements of front and rear wheels and a vehicle speed V, that is, a phase characteristic for a vehicle having a wheelbase L of 2.87 m.

(A) Based on a wheelbase L and a vehicle speed V of the vehicle, phase characteristic of a wheelbase filter function Ps for various vehicle speeds are derived by calculation. As shown in FIG. 4, the phase characteristic is the relationships between a frequency Froad of a road surface input, a phase difference Δφ of vertical displacements of the vehicle body at the positions of the front and rear wheels, and a vehicle speeds V. FIG. 4 shows the phase characteristic of the vehicle having a wheelbase L of 2.87 m. The wheelbase filter function Ps is a function representing a phase of a vertical displacement of the vehicle body at the position of the rear wheels with respect to a vertical displacement of the vehicle body at the position of the front wheels and is represented by the following equation (1) with s as the Laplace operator. In FIG. 4, in order to avoid complication, the phase characteristic is shown only for representative vehicle speeds of 30 km/h, 65 km/h and 100 km/h.

$$Ps = e^{\frac{L}{V}s} \quad (1)$$

(B) A vehicle model is set based on parameters such as a pitch rotation spring constant and a pitch moment of inertia of the vehicle to which the first embodiment is applied, and a pitch resonance frequency Fpres of the vehicle is calculated based on the vehicle model. The pitch resonance frequency Fpres of the example shown in FIG. 4 is 1.9 Hz.

Figure 5:
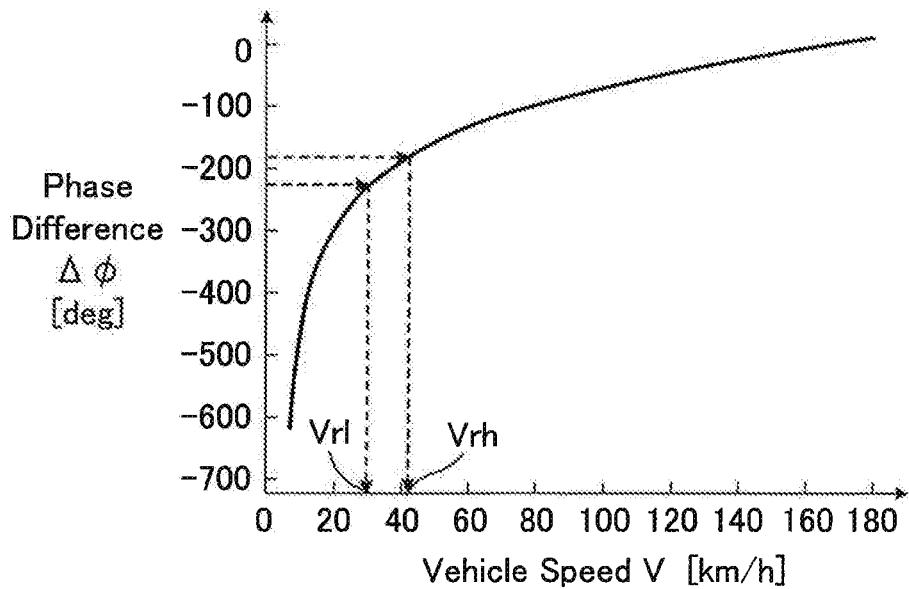
FIG. 5 is a graph showing a relationship between a phase difference Δφ between vertical displacements of the front and rear wheels and a vehicle speed V for a vehicle having a wheelbase L of 2.87 m.

(C) As shown by the broken arrows in FIG. 4, in the phase characteristic of the wheelbase filter function Ps, phase differences Δφ at various vehicle speeds V (for example, at vehicle speeds of every 2 km/h from zero to a maximum vehicle speed Vmax of the vehicle) are obtained with respect to the pitch resonance frequency Fpres of the vehicle. A map showing the relationship between a vehicle speed V and a phase difference Δφ of a vertical displacement of the vehicle body at the position of the rear wheels with respect to a vertical displacement of the vehicle body at the position of the front wheels is made based on the obtained phase differences Δφ. The curve of the map shown in FIG. 5 is a curve smoothly connecting the coordinate points of the vehicle speeds V and the phase differences Δφ obtained as described above.

Figure 6:
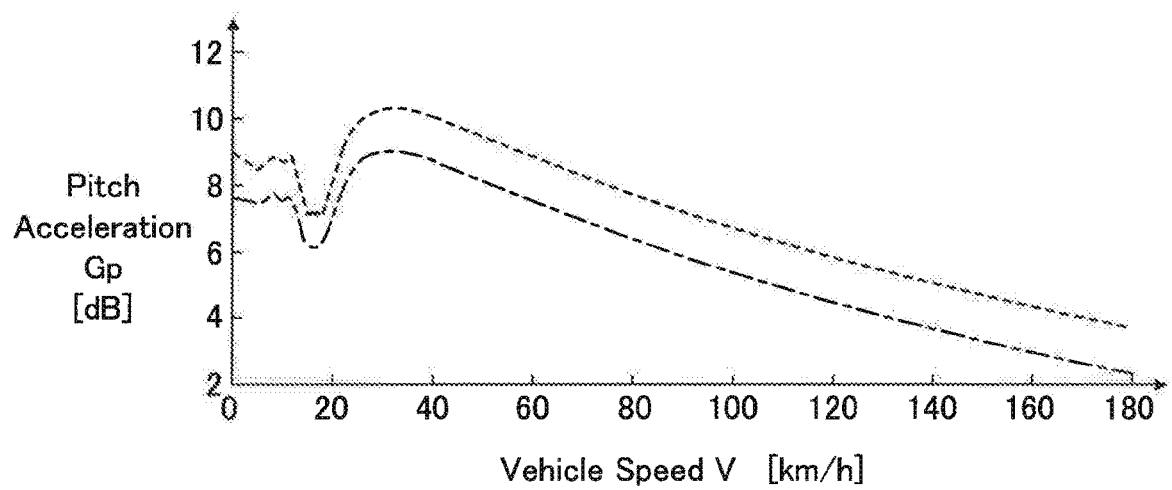
FIG. 6 is a graph showing examples of a relationship between a vehicle speed V and a pitch acceleration Gp for the case where a conventional pitch damping control is performed (dashed line) and the case where the conventional pitch damping control is not performed (broken line).
Figure 7:
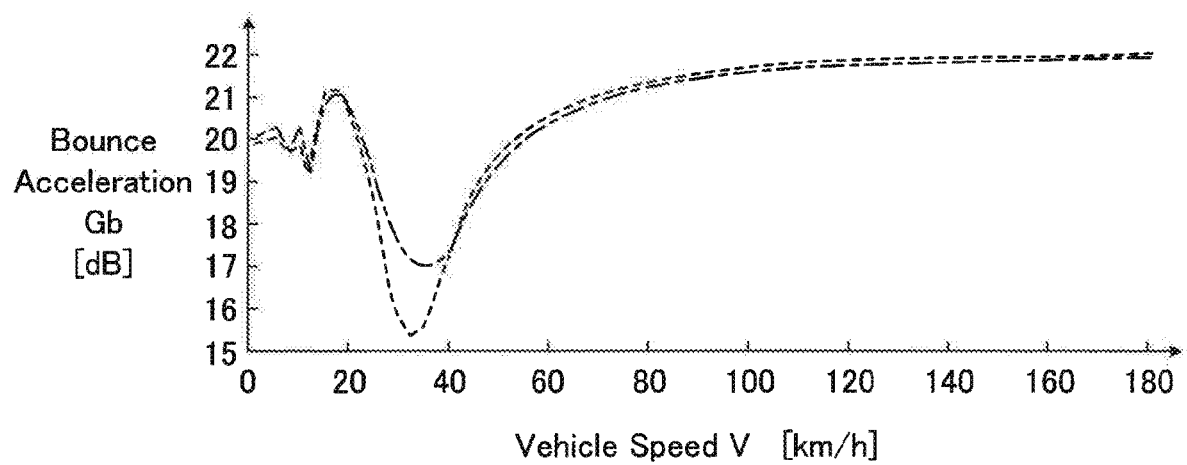
FIG. 7 is a graph showing examples of a relationship between a vehicle speed V and a bounce acceleration Gb for the case where a conventional pitch damping control is performed (dashed line) and the case where the conventional pitch damping control is not performed (broken line).

(D) Based on the above vehicle model, a pitch acceleration Gp and a bounce acceleration Gb (areas of the power spectral density of the resonance range of the frequency response) at the pitch resonance frequency Fpres of the vehicle are calculated with respect to various vehicle speeds V (for example, at a vehicle speed of every 2 km/h from zero to the maximum vehicle speed Vmax of the vehicle). FIGS. 6 and 7 show examples of the relationship between a vehicle speed V and a pitch acceleration Gp and the relationship between a vehicle speed V and a bounce acceleration Gb, respectively. Particularly, the dashed line and the broken line indicate the relationship in the case where a conventional pitch damping control is performed and the relationship in the case where the conventional pitch damping control is not performed, respectively.

As shown in FIG. 6, a pitch vibration can be reduced over the entire vehicle speed range by the pitch damping control. However, as shown in FIG. 7, in the case of the exemplary vehicle specifications (L=2.87 m, Fpres=1.9 Hz), in the range where the vehicle speed V is equal to or less than 42 km/h, specifically the vehicle speed V is 28 km/h or more and 42 km/h or less, bounce vibration deteriorates when the pitch damping control is performed as compared to where the pitch damping control is not performed. In particular, in the central region of the above-mentioned vehicle speed range, the bounce vibration is remarkably deteriorated, which is considered to be a cause of deterioration of ride comfort felt by occupants in the situation where the pitch damping control is being performed.

Hereinafter, the range of the vehicle speed at which the bounce vibration deteriorates when the pitch damping control is performed as compared to where the pitch damping control is not performed is referred to as a "specific vehicle speed range". The lower limit and upper limit vehicle speeds of the specific vehicle speed range are referred to as a lower limit reference vehicle speed Vrl and an upper limit reference vehicle speed Vrh, respectively. In the exemplary vehicle specification, the specific vehicle speed range is 28 km/h or more and 42 km/h or less, and the lower limit reference vehicle speed Vrl and the upper limit reference vehicle speed Vrh are 28 km/h and 42 km/h, respectively.

(E) The above (A) to (D) were applied to various vehicle specifications. As a result, it was found that although the lower limit reference vehicle speed Vrl and the upper limit reference vehicle speed Vrh are different depending on the specifications, regardless of the specifications, the upper limit reference vehicle speed corresponds to the phase difference Δφ of −180° and the lower limit reference vehicle speed corresponds to the phase difference Δφ of −225° which is 45° smaller than the −180°. Therefore, the upper limit reference vehicle speed Vrh or the upper limit reference vehicle speed and the lower limit reference vehicle speed Vrl can be obtained for each vehicle type to which the present disclosure is applied. For example, as shown by broken line arrows in FIG. 5, the vehicle speeds corresponding to the phase difference Δφ of −180° and −225° are respectively set to the upper limit reference vehicle speed Vrh and the lower limit reference vehicle speed Vrl, respectively.

As described above. in the first embodiment. the ECU 14 executes the vibration damping control (pitch damping control) of the vehicle according to the control program corresponding to the flowchart shown in FIG. 2, and when a vehicle speed V is equal to or lower than the upper limit reference vehicle speed Vrh, the ECU 14 reduces to correct the pitch damping driving torque Tpd for correction to zero.

Next, with reference to the flowchart shown in FIG. 2, a vibration damping control routine for a vehicle according to the first embodiment will be described. The control according to the flowchart shown in FIG. 2 is repeatedly executed at predetermined time intervals when an ignition switch (not shown) is ON.

First, in step 10, signals indicating wheel speeds Vwi detected by the wheel speed sensors 34FL to 34RR are read. In step 20, a vehicle speed V is calculated based on the wheel speeds Vwi in a manner known in the art. A vehicle speed V may be detected by a vehicle speed sensor (not shown).

In step 30, a pitch angular velocity Vp of the vehicle body, which is a state variable of a pitch vibration of the vehicle, is calculated based on the wheel speeds Vwi in the manner described in the above-mentioned Japanese Patent Application Laid-Open Publication No. 2012-46037, for example.

In step 40, a pitch damping driving torque Tpd is calculated according to the following equation (2), where Kp is a control gain for the pitch vibration.

$$Tpd = Kp \times Vp \quad (2)$$

In step 50, based on an accelerator opening degree Acc detected by the accelerator opening degree sensor 38, a driver-requiring driving torque Tdd corresponding to a driving force of the vehicle requested by a driver is calculated in a manner known in the art.

Figure 3:
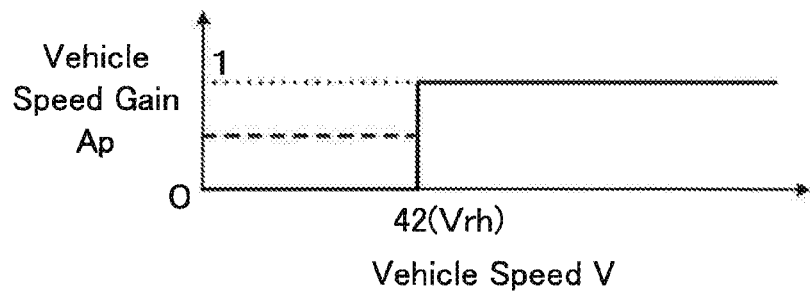
FIG. 3 is a map for calculating a vehicle speed gain Ap for pitch damping based on a vehicle speed V in the first embodiment.

In step 60, a vehicle speed gain Ap for pitch damping is calculated by referring to the map indicated by the solid line in FIG. 3 based on the vehicle speed V. As shown in FIG. 3, the vehicle speed gain Ap is 1 when the vehicle speed V exceeds 42 km/h which is the upper limit reference vehicle speed Vrh, and is zero when the vehicle speed V is 42 km/h or less. Although not shown in FIG. 2, when the vehicle speed gain Ap varies between zero and 1, the vehicle speed gain Ap may be processed so that it gradually changes.

In step 80 executed next to step 60, a target driving torque Tdt of the vehicle is calculated as a sum of the driver-requiring driving torque Tdd and a product of the vehicle speed gain Ap and the pitch damping driving torque Tpd according to the following equation (3).

$$Tdt = Tdd + Ap \times Tpd \quad (3)$$

In step 100 executed next to step 80, an output of the engine 12 is controlled so that a driving torque Te of the engine 12 becomes the target driving torque Tdt.

As understood from the above description, according to the first embodiment, a pitch damping driving torque Tpd based on a pitch angular velocity Vp of the vehicle body is calculated in steps 10 to 40, and in step 50, a driver-requiring driving torque Tdd is calculated. In step 80, a target driving torque Tdt of the vehicle is calculated as a sum of the driver-requiring driving torque Tdd and a product of a vehicle speed gain Ap and the pitch damping driving torque Tpd, and in step 100, an output of the engine 12 is controlled so that a driving torque Te of the engine 12 becomes the target driving torque Tdt.

The vehicle speed gain Ap is set in step 60 according to a vehicle speed V so that the gain is 1 when the vehicle speed V exceeds 42 km/h which is the upper limit reference vehicle speed Vrh, and is zero when the vehicle speed V is equal to or less than 42 km/h. Therefore, when a vehicle speed V exceeds 42 km/h, a target driving torque Tdt of the vehicle is equal to a sum of the driver-requiring driving torque Tdd and the pitch damping driving torque Tpd, so that the pitch damping control is performed. On the other hand, when a vehicle speed V is equal to or less than 42 km/h, a pitch damping driving torque Tpd is equivalently reduced for correction to zero and, so that pitch damping control is not performed.

Figure 8:
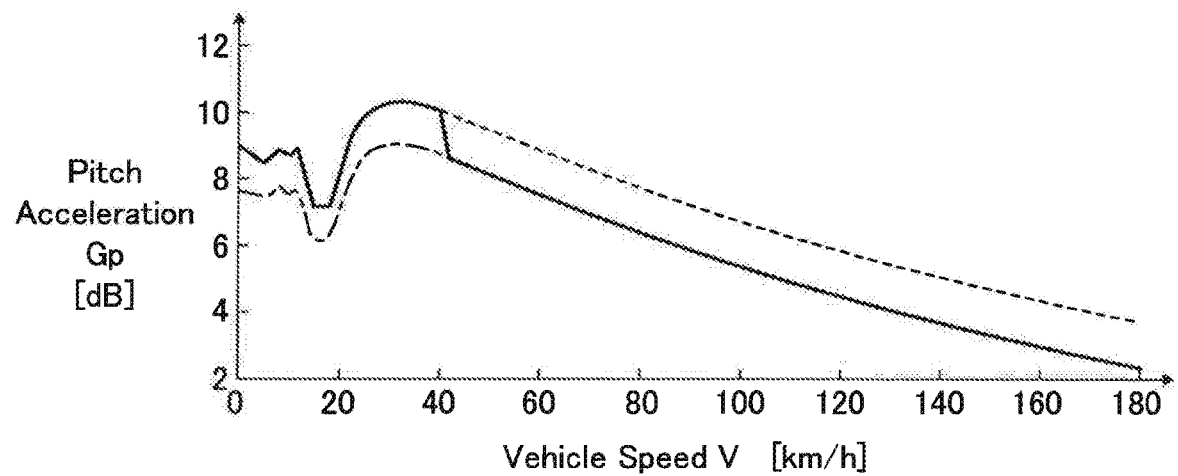
FIG. 8 is a graph showing an example of a relationship between a vehicle speed V and a pitch acceleration Gp for the case where the pitch damping control according to the first embodiment is performed in comparison with the two cases (dashed line and broken line) in FIG. 6.
Figure 9:
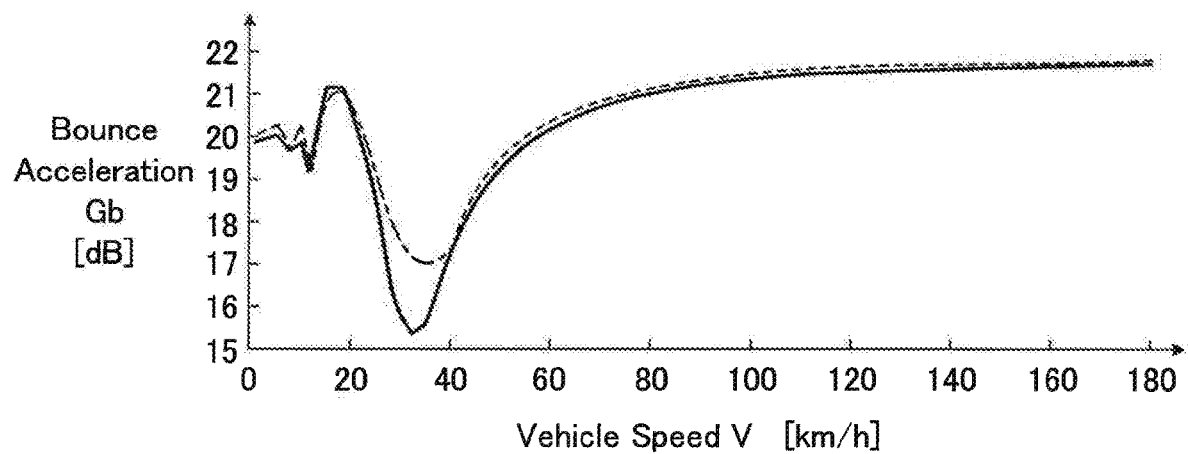
FIG. 9 is a graph showing an example of a relationship between a vehicle speed V and a bounce acceleration Gb for the case where the pitch damping control according to the first embodiment is performed in comparison with the two cases (dashed line and broken line) in FIG. 7.

FIG. 8 shows a graph of an example of a relationship between a vehicle speed V and a pitch acceleration Gp for the case where the pitch damping control according to the first embodiment is performed in comparison with to two cases (dashed line and broken line) shown in FIG. 6. Similarly, FIG. 9 shows a graph of an example of a relationship between a vehicle speed V and a bounce acceleration Gb for the case where the pitch damping control according to the first embodiment is performed, in comparison with the two cases (dashed line and broken line) shown in FIG. 7.

As understood from the comparison between FIG. 8 and FIG. 6, the pitch acceleration Gp in the range where a vehicle speed V is not more than 42 km/h is slightly larger than that in the case where a conventional pitch damping control is performed. However, as can be seen from the comparison between FIG. 9 and FIG. 7, a bounce acceleration Gb in the specific vehicle speed range where a vehicle speed V is 28 km/h or more and 42 km/h or less, particularly in the center region thereof, can be made significantly smaller than that when the conventional pitch damping control is performed.

The above effect can be obtained irrespective of the specifications of a vehicle, particularly a wheelbase and a pitch resonance frequency. Therefore, according to the first embodiment, as compared with a conventional vibration control for a vehicle in which a pitch damping control is performed over the entire vehicle speed range, a bounce vibration of the vehicle body in the specific vehicle speed range can be reduced, which enables to improve ride comfort of the vehicle in the specific vehicle speed range.

Second Embodiment

In the second embodiment, the ECU 14 executes vibration damping control of the vehicle as in the first embodiment, except that a pitch damping driving force is reduced to zero when a vehicle speed V is equal to or higher than the lower limit reference vehicle speed Vrl and equal to or lower than the upper limit reference vehicle speed Vrh.

Figure 10:
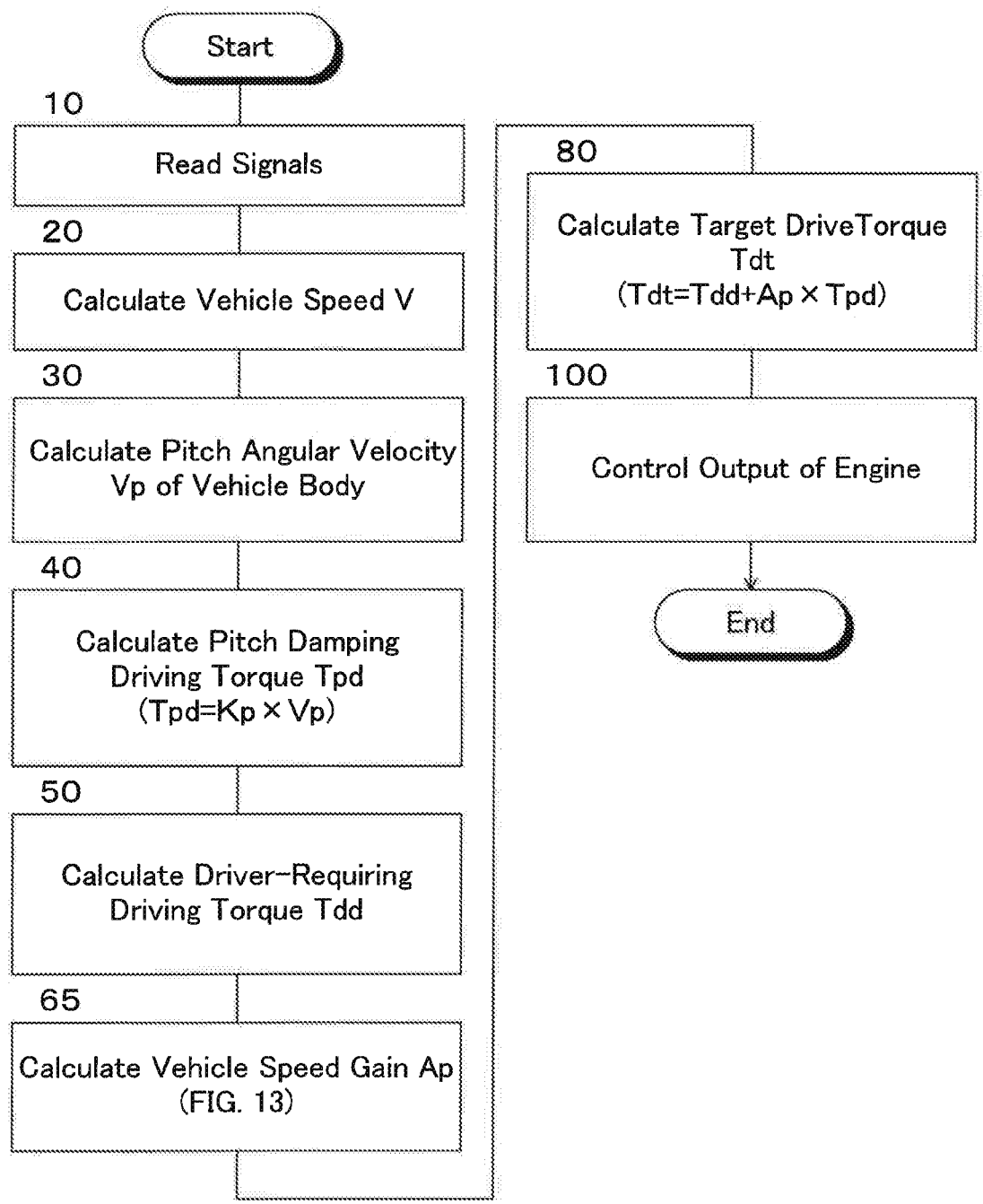
FIG. 10 is a flowchart showing a vibration damping control routine for a vehicle according to the second embodiment.

FIG. 10 is a flowchart showing a vibration damping control routine for a vehicle according to the second embodiment. In FIG. 10, the same step numbers as those shown in FIG. 2 are assigned to the same steps as those shown in FIG. 2. This also applies to FIGS. 11 and 12 to be described later.

As can be seen from the comparison between FIG. 10 and FIG. 2, steps 10 to 50 and steps 80 and 100 are executed in the same manner as in the first embodiment. When step 50 is completed, step 65 is executed instead of step 60. When step 65 is completed, the vibration damping control proceeds to step 80.

Figure 13:
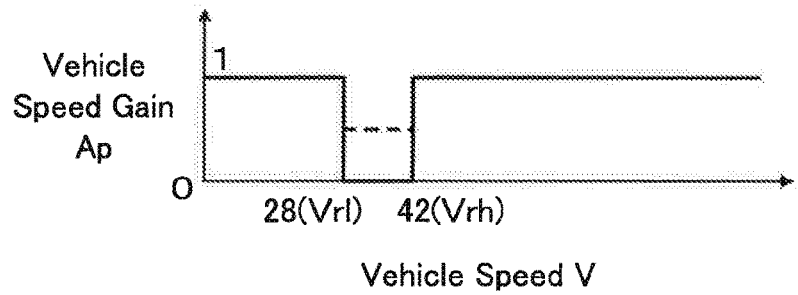
FIG. 13 is a map for calculating a vehicle speed gain Ap for pitch damping based on a vehicle speed V in the second embodiment.

In step 65, a vehicle speed gain Ap for pitch damping is calculated by referring to the map indicated by the solid line in FIG. 13 based on the vehicle speed V. As shown in FIG. 13, the vehicle speed gain Ap is 1 when the vehicle speed V is less than 28 km/h which is the lower limit reference vehicle speed Vrl or when it exceeds 42 km/h which is the upper limit reference vehicle speed Vrh, and the gain is zero when the vehicle speed V is within the specific vehicle speed range, that is, when it is 28 km/h or more and 42 km/h or less. As described above, the upper limit reference vehicle speed Vrh is a vehicle speed at which a phase difference Δφ becomes −180°, and the lower limit reference vehicle speed Vrl is a vehicle speed at which a phase difference Δφ becomes −225° that is smaller than −180° by 45° which is a preset value.

According to the second embodiment, the vehicle speed gain Ap is variably set according to a vehicle speed V in step 65 so that the gain becomes 1 when the vehicle speed V is less than 28 km/h or more than 42 km/h, and becomes zero when the vehicle speed V is 28 km/h or more and 42 km/h or less. Therefore, when a vehicle speed V is less than 28 km/h or more than 42 km/h, the target driving torque Tdt of the vehicle is equal to a sum of the driver-requiring driving force Tdd and the pitch damping driving force Tpd, so that the pitch damping control is performed in the same manner as the conventional damping control. In contrast, when a vehicle speed V is equal to or greater than 28 km/h and equal to or less than 42 km/h, the pitch damping drive force Tpd is equivalently reduced for correction to zero, so that pitch damping control is not performed.

Figure 14:
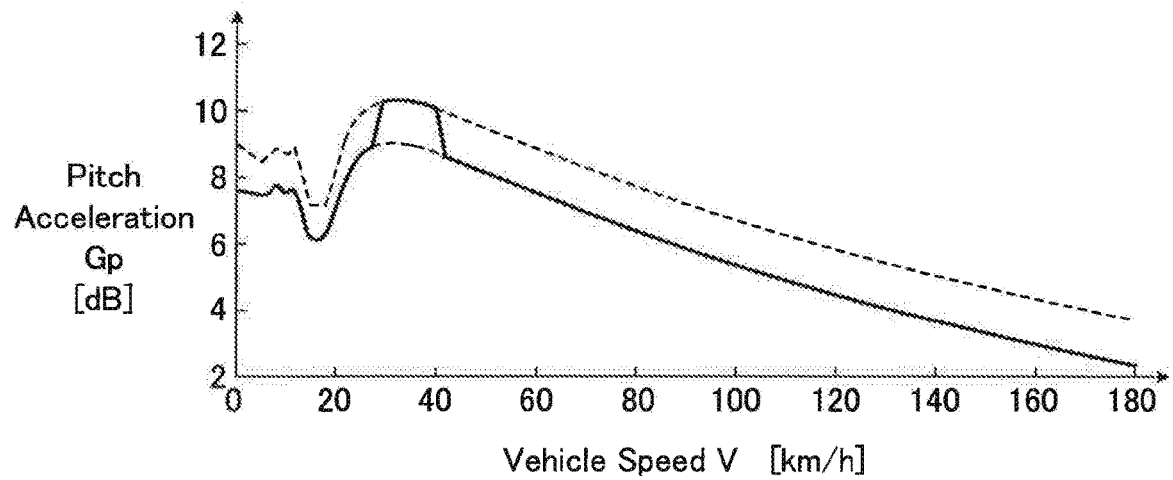
FIG. 14 is a graph showing an example of a relationship between a vehicle speed V and a pitch acceleration Gp for the case where the pitch damping control according to the second embodiment is performed in comparison with the two cases (dashed line and broken line) in FIG. 6.
Figure 15:
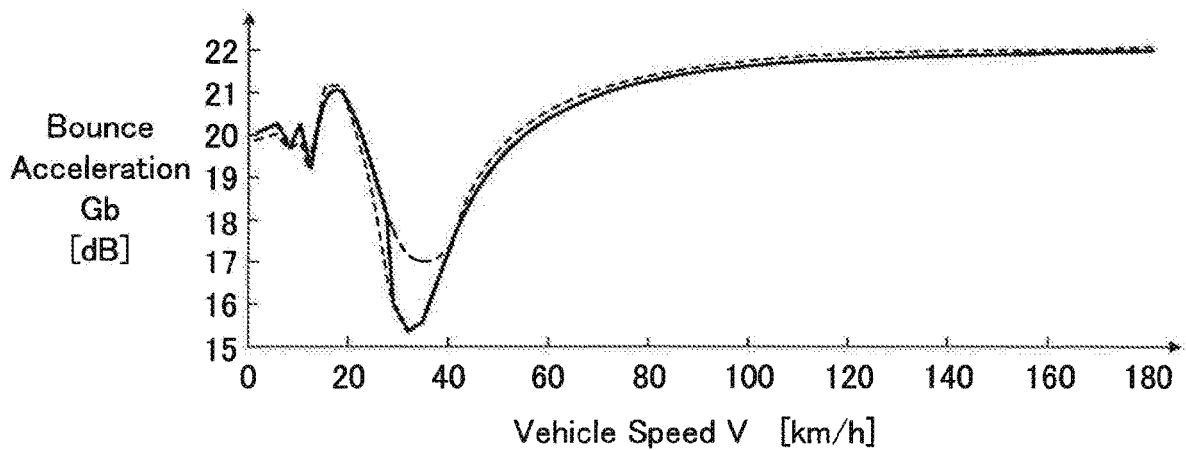
FIG. 15 is a graph showing an example of a relationship between a vehicle speed V and a bounce acceleration Gb for the case where the pitch damping control according to the second embodiment is performed in comparison with the two cases (dashed line and broken line) in FIG. 7.

FIG. 14 shows a graph of an example of a relationship between a vehicle speed V and a pitch acceleration Gp for the case where the pitch damping control according to the second embodiment is performed in comparison with two cases (dashed line and broken line) shown in FIG. 6. Similarly, FIG. 15 shows a graph of an example of a relationship between a vehicle speed V and a bounce acceleration Gb for the case where the pitch damping control according to the second embodiment is performed, in comparison with the two cases (dashed line and broken line) shown in FIG. 7.

As understood from the comparison between FIG. 14 and FIG. 6, the pitch acceleration Gp in the specific vehicle speed range where a vehicle speed V is 28 km/h or more and 42 km/h or less is slightly larger than that in the case where a conventional pitch damping control is performed. However, as can be seen from the comparison between FIG. 15 and FIG. 7, a bounce acceleration Gb in the specific vehicle speed range, particularly in the center region thereof, can be made significantly smaller than that when the conventional pitch damping control is performed.

The above effect can be obtained irrespective of the specifications of a vehicle, particularly a wheelbase and a pitch resonance frequency. Therefore, according to the second embodiment, as in the first embodiment, as compared with a conventional vibration control for a vehicle in which a pitch damping control is performed over the entire vehicle speed range, a bounce vibration of the vehicle body in the specific vehicle speed range can be reduced, which enables to improve ride comfort of the vehicle in the specific vehicle speed range. Further, according to the second embodiment, the pitch vibration of the vehicle body in the low vehicle speed range where a vehicle speed V is less than 28 km/h which is the lower limit reference vehicle speed Vrl can be reduced as compared with the first embodiment.

Third Embodiment

In the third embodiment, the ECU 14 calculates a pitch angular velocity Vp and a bounce velocity Vb of the vehicle body based on wheel speeds Vwi of the wheels, and calculates a pitch damping driving torque Tpd and a bounce damping driving torque Tbd based on the pitch angular velocity Vp and the bounce velocity Vb, respectively. When a vehicle speed V exceeds the upper limit reference vehicle speed Vrh, the ECU 14 corrects the bounce damping driving torque Tbd to be reduced to zero. Further, the ECU 14 calculates a target driving torque Tdt of the engine 12 based on the driver-requiring driving torque Tdd, the pitch damping driving torque Tpd, and the bounce damping driving torque Tbd, and controls an output of the engine 12 so that a driving torque Te of the engine 12 becomes the target driving torque Tdt.

Figure 11:
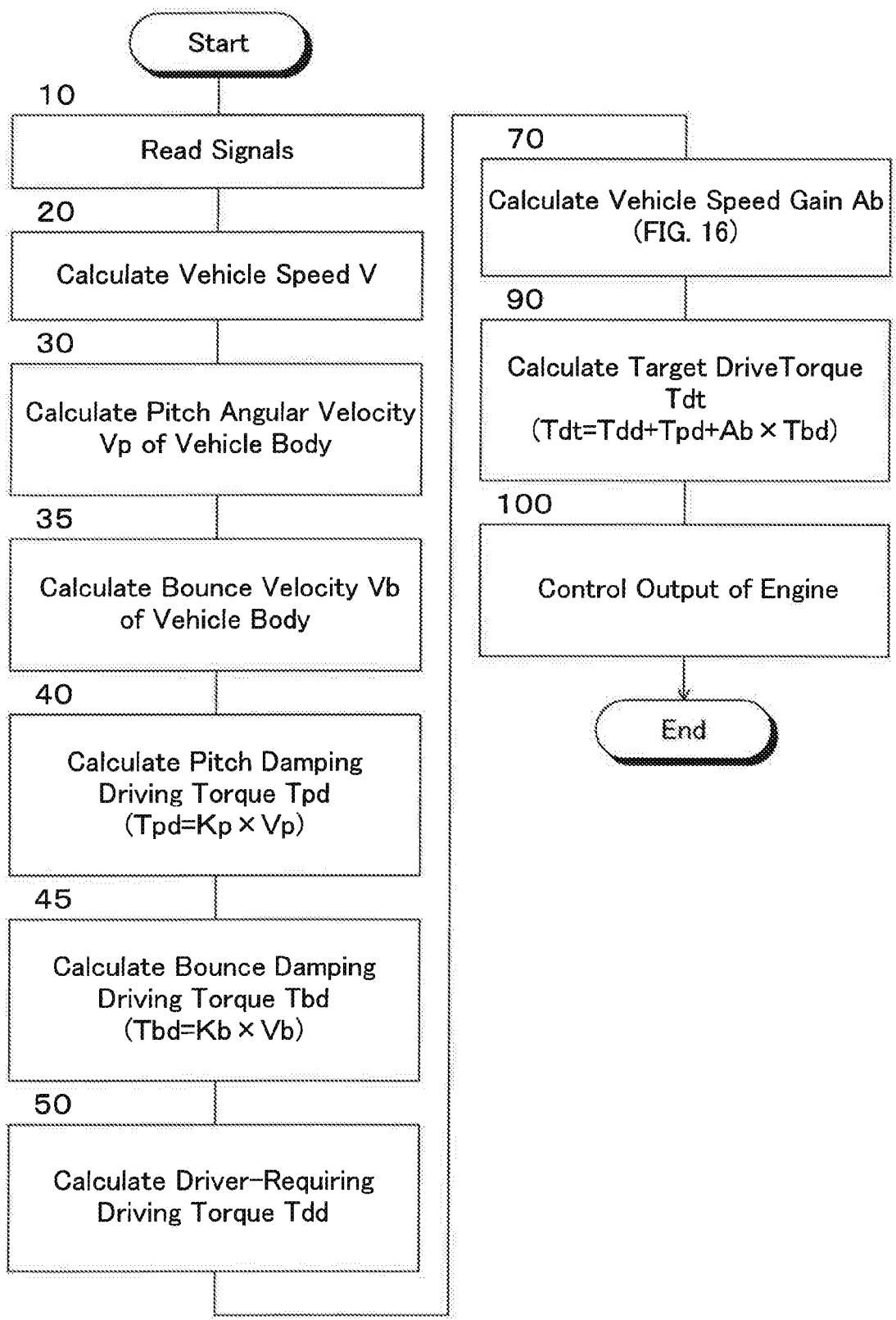
FIG. 11 is a flowchart showing a vibration damping control routine for a vehicle according to the third embodiment.

FIG. 11 is a flowchart showing a vibration damping control routine for a vehicle according to the third embodiment. As can be understood from the comparison between FIG. 11 and FIG. 2, steps 10 to 30, 40, 50, and 100 are executed in the same manner as in the first embodiment. Upon completion of step 30, step 35 is executed prior to step 40.

In step 35, a bounce speed Vb of the vehicle body is calculated based on the wheel speeds Vwi, for example, in the manner described in the aforementioned Japanese Patent Application Laid-Open Publication No. 2012-46037.

Upon completion of step 40, step 45 is executed prior to step 50. In step 45, a bounce damping driving torque Tbd is calculated according to the following equation (4), where Kb is a control gain of the bounce vibration.

$$Tbd = Kb \times Vb \tag{4}$$

Figure 16:
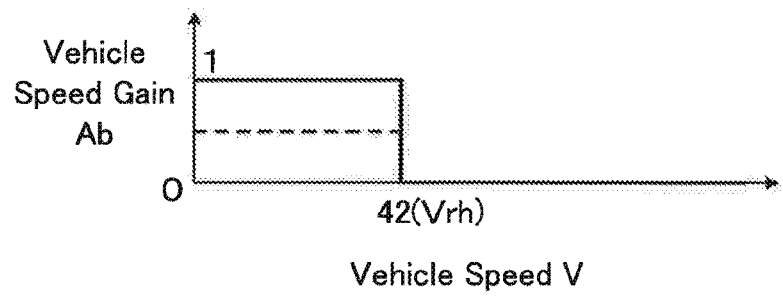
FIG. 16 is a map for calculating a vehicle speed gain Ab for bounce damping based on a vehicle speed V in the third embodiment.

Upon completion of step 50, step 70 is executed. In step 70, a vehicle speed gain Ab for bounce damping control is calculated by referring to the map indicated by the solid line in FIG. 16 based on the vehicle speed V. As shown in FIG. 16, the vehicle speed gain Ab is zero when the vehicle speed V exceeds 42 km/h which is the upper limit reference vehicle speed Vrh, and is 1 when the vehicle speed V is 42 km/h or less.

Upon completion of step 70, step 90 is executed. In step 90, a target driving torque Tdt of the vehicle is calculated according to the following equation (5).

$$Tdt = Tdd + Tpd + Ab \times Tbd \tag{5}$$

According to the third embodiment, a pitch damping driving torque Tpd based on the pitch angular velocity Vp of the vehicle body and a bounce damping driving torque Tbd based on the bounce velocity Vb of the vehicle body are calculated in steps 10 to 45, and in step 50, a driver-requiring torque Tdd is calculated. In step 90, a target driving torque Tdt of the vehicle is calculated as a sum of the driver-requiring driving torque Tdd, the pitch damping driving torque Tpd, the product Ab×Tbd of the vehicle speed gain Ab and the bounce damping driving torque Tbd. Further, in step 100, an output of the engine 12 is controlled so that a driving torque Te of the engine 12 becomes the target driving torque Tdt.

In step 70, a vehicle speed gain Ab is variably set according to the vehicle speed V so that the gain becomes 1 when the vehicle speed V is equal to or less than 42 km/h which is the upper limit reference vehicle speed Vrh, and becomes zero when the vehicle speed V exceeds 42 km/h. Therefore, when the vehicle speed V is equal to or less than 42 km/h, the target driving torque Tdt of the vehicle is equal to a sum of the driver-requiring driving torque Tdd, the pitch damping driving torque Tpd, and the bounce damping driving torque Tbd, so that the damping control of the vehicle is carried out in the same manner as the conventional vehicle vibration control in which both the pitch damping control and the bounce damping control are performed. In contrast, when the vehicle speed V exceeds 42 km/h, the bounce damping driving torque Tbd is equivalently reduced for correction to zero, so that the bounce damping control is not performed.

Figure 17:
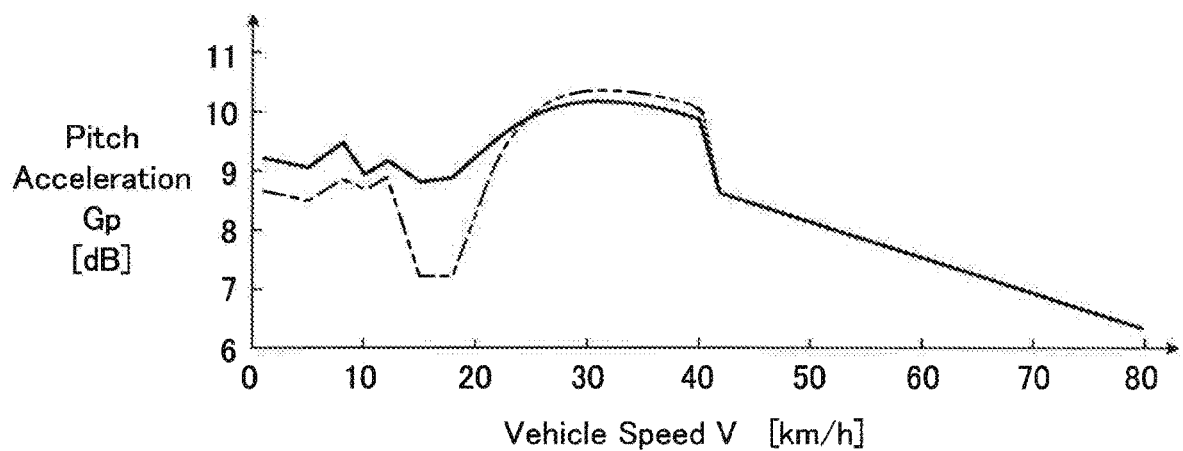
FIG. 17 is a graph showing an example of a relationship between a vehicle speed V and a pitch acceleration Gp for the case where the vibration damping control according to the third embodiment is performed in comparison with a relationship in a conventional vehicle damping control in which the bounce damping control is not performed over the entire vehicle speed range (two-dot chain line).

FIG. 17 shows a graph of an example of the relationship between a vehicle speed V and a pitch acceleration Gp for the case where the vibration damping control of the vehicle according to the third embodiment is performed in comparison with the case of the conventional vehicle damping control in which the bounce damping control is not performed over the entire vehicle speed range (two-dot chain line). Similarly, FIG. 18 shows a graph of an example of the relationship between a vehicle speed V and a bounce acceleration Gb for the case where the vibration damping control of the vehicle according to the third embodiment is performed in comparison with the case of the conventional vehicle damping control in which the bounce damping control is not performed over the entire vehicle speed range (two-dot chain line).

Figure 18:
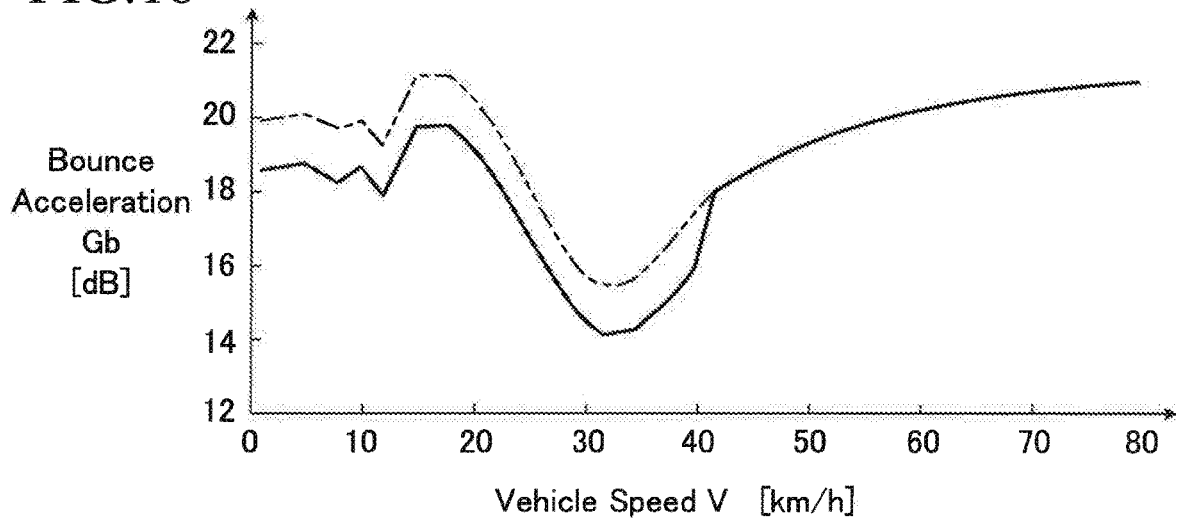
FIG. 18 is a graph showing an example of a relationship between a vehicle speed V and a bounce acceleration Gb for the case where the vibration damping control according to the third embodiment is performed in comparison with a relationship in a conventional vehicle damping control in which the bounce damping control is not performed over the entire vehicle speed range (two-dot chain line).

As understood from FIG. 18, the bounce acceleration Gb in the range where a vehicle speed V is equal to or less than 42 km/h can be made smaller than that in the conventional vibration damping control for a vehicle. However, as can be seen from FIG. 17, the pitch acceleration Gp in the low vehicle speed range becomes slightly larger than that in the conventional vibration damping control for a vehicle.

The above effect can be obtained irrespective of the specifications of a vehicle, particularly a wheelbase and a pitch resonance frequency. Therefore, according to the third embodiment, a bounce vibration of the vehicle body in the vehicle speed range below the upper limit reference vehicle speed Vrh can be reduced as compared with that in the conventional vibration damping control for a vehicle in which the bounce damping control is not performed over the entire vehicle speed range, which enables to improve ride comfort of the vehicle in low and middle vehicle speed ranges. Further, in the vehicle speed range where a vehicle speed exceeds the upper limit reference vehicle speed Vrh, the bounce damping control is not performed, so that deterioration of a pitch vibration caused by the bounce damping control can be avoided.

Fourth Embodiment

In the fourth embodiment, the ECU 14 calculates a pitch angular velocity Vp and a bounce velocity Vb of the vehicle body based on wheel speeds Vwi of the wheels, and calculates a pitch damping driving torque Tpd and a bounce damping driving torque Tbd based on the pitch angular velocity Vp and the bounce velocity Vb, respectively. When a vehicle speed V is equal to or lower than the upper limit reference vehicle speed Vrh, the ECU 14 reduces the pitch damping driving torque Tpd for correction to zero. When a vehicle speed V exceeds the upper limit reference vehicle speed Vrh, the ECU 14 reduces the bounce damping driving torque Tbd for correction to zero. Further, the ECU 14 calculates a target driving torque Tdt of the engine 12 based on the driver-requiring driving torque Tdd, the pitch damping driving torque Tpd, and the bounce damping driving torque Tbd, and controls an output of the engine 12 so that a driving torque Te of the engine 12 becomes the target driving torque Tdt.

Figure 12:
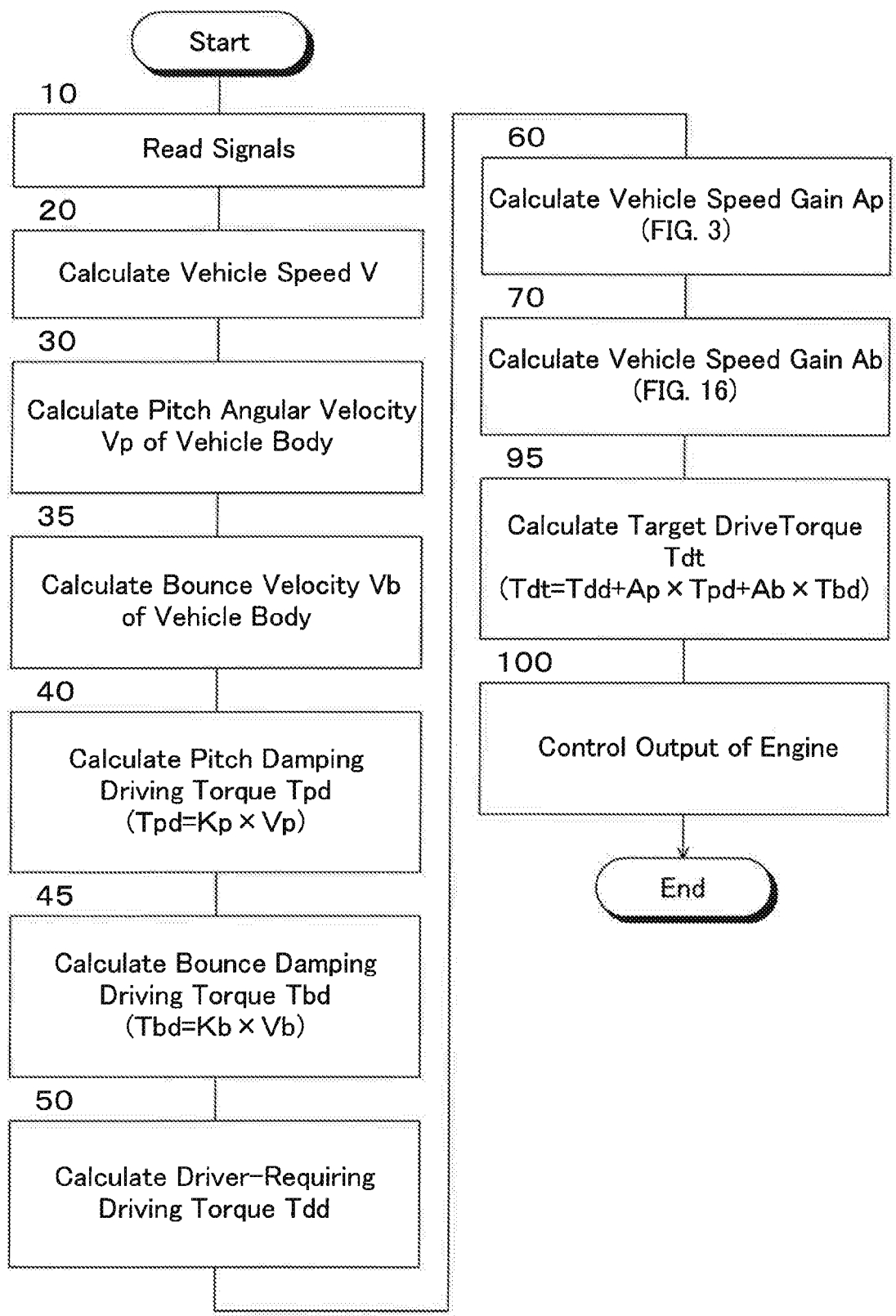
FIG. 12 is a flowchart showing a vibration damping control routine for a vehicle according to the fourth embodiment.

FIG. 12 is a flowchart showing a vibration damping control routine for a vehicle according to the fourth embodiment. As can be understood from the comparison between FIG. 12 and FIG. 11, steps 10 to 50, 70, and 100 are executed in the same manner as in the third embodiment. Upon completion of step 50, step 60 is executed prior to step 70.

In step 60, a vehicle speed gain Ap for pitch damping is calculated by referring to the map shown in FIG. 3 based on the vehicle speed V in the same manner as in step 60 of the first embodiment.

When step 70 is completed, step 95 is executed in place of step 90 prior to step 100. In step 95, a target driving torque Tdt of the vehicle is calculated according to the following equation (6).

$$Tdt = Tdd + Ap \times Tpd + Ab \times Tbd \tag{6}$$

According to the fourth embodiment, in step 60, a vehicle speed gain Ap for pitch damping is variably set according to a vehicle speed V so that the gain becomes 1 when the vehicle speed V exceeds 42 km/h which is the upper limit reference vehicle speed Vrh, and becomes zero when the vehicle speed V is equal to or less than 42 km/h. A vehicle speed gain Ab for bounce damping is variably set according to a vehicle speed V as in the third embodiment. Therefore, when a vehicle speed V exceeds 42 km/h, the bounce damping driving force Tbd is equivalently reduced for correction to zero and the target driving torque Tdt of the vehicle is corrected to a sum of the driver-requiring driving force Tdd and the pitch damping driving torque Tpd, so that the pitch damping control is performed. On the other hand, when a vehicle speed V is equal to or less than 42 km/h, the pitch damping driving torque Tpd is equivalently reduced for correction to zero, and the target driving torque Tdt of the vehicle becomes a sum of the driver-requiring drive force Tdd and the bounce damping driving torque Tbd, so that the bounce damping control is performed.

Figure 19:
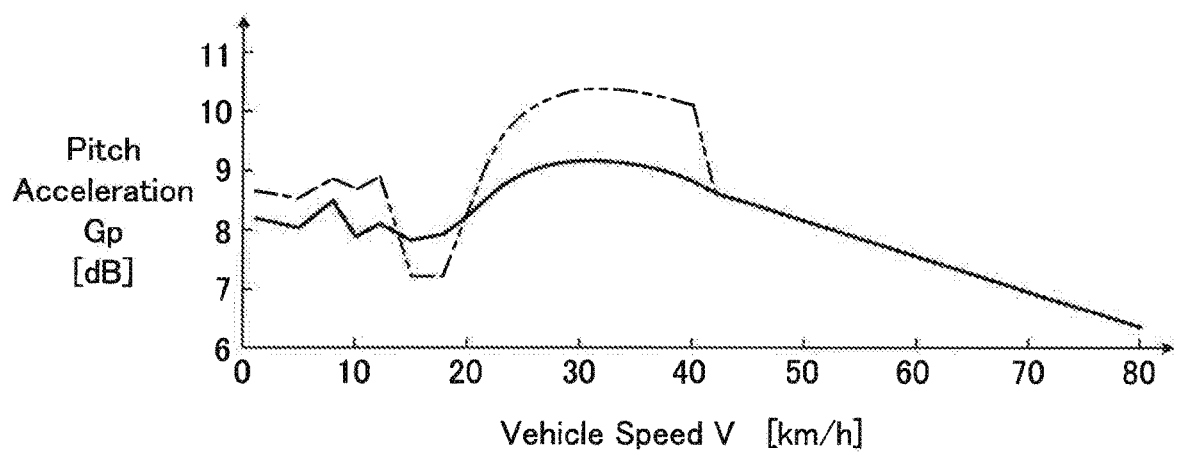
FIG. 19 is a graph showing an example of a relationship between a vehicle speed V and a pitch acceleration Gp for the case where the vibration damping control according to the fourth embodiment is performed in comparison with a relationship in a conventional vehicle damping control in which the bounce damping control is not performed over the entire vehicle speed range (two-dot chain line).

FIG. 19 shows a graph of an example of the relationship between a vehicle speed V and a pitch acceleration Gp for the case where the vibration damping control for a vehicle according to the fourth embodiment is performed in comparison with the case of the conventional vehicle damping control in which the bounce damping control is not performed over the entire vehicle speed range (two-dot chain line). Similarly, FIG. 20 shows a graph of an example of the relationship between a vehicle speed V and a bounce acceleration Gb for the case where the vibration damping control of the vehicle according to the fourth embodiment is performed in comparison with the case of the conventional vehicle damping control in which the bounce damping control is not performed over the entire vehicle speed range (two-dot chain line).

Figure 20:
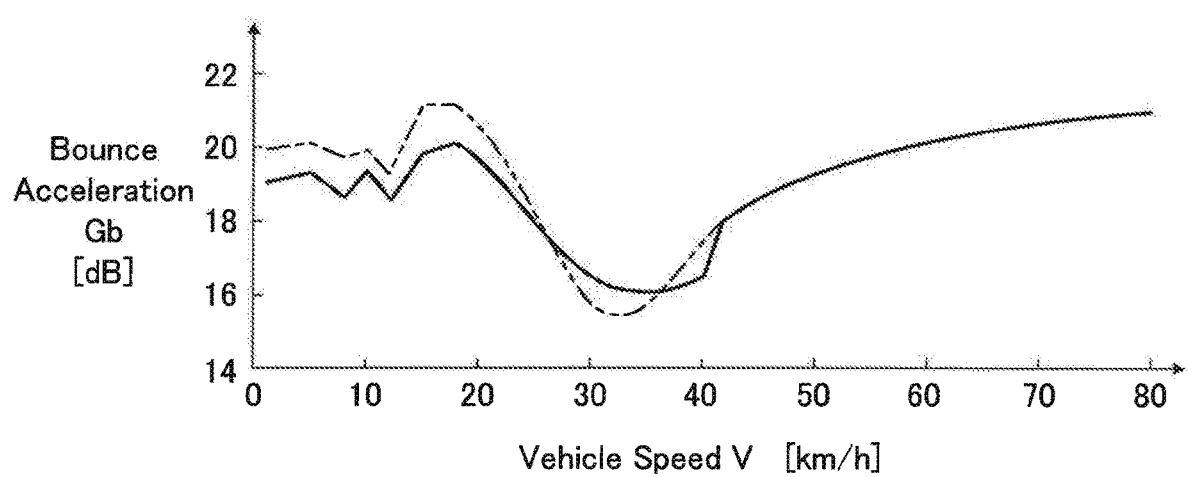
FIG. 20 is a graph showing an example of a relationship between a vehicle speed V and a bounce acceleration Gb for the case where the vibration damping control according to the fourth embodiment is performed in comparison with a relationship in a conventional vehicle damping control in which the bounce damping control is not performed over the entire vehicle speed range (two-dot chain line).

As understood from FIGS. 19 and 20, it is possible to reduce pitch vibration of the vehicle body in the specific vehicle speed range (28 km/h or more and 42 km/h or less) as compared with that in the conventional vehicle damping control (two-dot chain line) without substantially deteriorating bounce vibration of the vehicle body in the specific vehicle speed range. In addition, as compared with the conventional vibration damping control for a vehicle, the pitch vibration and the bounce vibration of the vehicle body in the low vehicle speed range lower than the specific vehicle speed range can be reduced.

The above effect can be obtained irrespective of the specifications of a vehicle, particularly a wheelbase and a pitch resonance frequency. Therefore, according to the fourth embodiment, a pitch vibration of the vehicle body in the specific vehicle speed range can be reduced and pitch and bounce vibrations of the vehicle body in low vehicle speed range can be reduced as compared with those in the conventional vibration damping control for a vehicle in which the pitch damping control is performed and the bounce damping control is not performed over the entire vehicle speed range, which enables to improve ride comfort of the vehicle in low and middle vehicle speed ranges. Further, in the vehicle speed range where a vehicle speed exceeds the upper limit reference vehicle speed Vrh, the bounce damping control is not performed, so that deterioration of a pitch vibration caused by the bounce damping control can be avoided.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described embodiments, the upper limit reference vehicle speed Vrh is 42 km/h at which a phase difference Δφ of a vertical displacement of a vehicle body at the position of rear wheels with respect to a vertical displacement of the vehicle body at the position of front wheels is −180°. However, the upper limit reference vehicle speed Vrh may be set to a vehicle speed corresponding to −180°+α, where α is a constant equal to or larger than −5° and equal to or smaller than 5°.

Similarly, in the above-described second embodiment, the lower limit reference vehicle speed VrI is 28 km/h at which a phase difference Δφ of a vertical displacement of the vehicle body is −225°. However, the lower limit reference vehicle speed VrI may be set to a vehicle speed corresponding to −225°+β, where β is a constant equal to or greater than −15° and equal to or smaller than 5°, preferably greater than or equal to −10° and less than or equal to 0°.

In the above-described first and fourth embodiments, the vehicle speed gain Ap for pitch damping is set to zero when a vehicle speed V is equal to or lower than the upper limit reference vehicle speed Vrh, and in the second embodiment, the vehicle speed gain Ap is set to zero when a vehicle speed V is equal to or higher than the lower limit reference vehicle speed VrI and equal to or lower than the upper limit reference vehicle speed Vrh. However, as indicated by broken lines in FIGS. 3 and 13, for example, the vehicle speed gain Ap may be set to a value larger than zero and smaller than 1 when a vehicle speed V is a value within the above specific vehicle speed range. In that case, the pitch damping control is performed with a pitch damping driving torque Tpd reduced as compared to when a vehicle speed V is not a value within the above specific vehicle speed range.

Similarly, in the above-described fourth embodiment, the vehicle speed gain Ab for the bounce damping is set to 1 when a vehicle speed V is equal to or less than the upper limit reference vehicle speed Vrh. However, as shown by the broken line in FIG. 16, for example, the vehicle speed gain Ab may be set to a value larger than zero and smaller than 1 when a vehicle speed V is equal to or less than the upper limit reference vehicle speed Vrh. In that case, when a vehicle speed V is equal to or less than the upper limit reference vehicle speed Vrh, the bounce damping control is performed with a bounce damping driving torque Tbd reduced as compared to where the vehicle speed gain Ab is 1.

In the above-described first, second and fourth embodiments, a pitch angular velocity Vp of the vehicle body and a pitch damping driving torque Tpd are calculated irrespective of a vehicle speed V and a vehicle speed gain Ap is variably set according to the vehicle speed V so that the pitch damping driving torque Tpd is equivalently reduced for correction to zero. However, when a vehicle speed V is a value within the above specific vehicle speed range, the pitch damping driving torque Tpd may be reduced to zero by not calculating a pitch angular velocity Vp and a pitch damping driving torque Tpd of the vehicle body.

Similarly, in the above-described fourth embodiment, a bounce speed Vb of the vehicle body and a bounce damping driving torque Tbd are calculated irrespective of a vehicle speed V and a vehicle speed gain Ab is variably set according to the vehicle speed V so that the bounce damping driving torque Tbd is equivalently reduced for correction to zero. However, when a vehicle speed V is a value within the above specific vehicle speed range, the bounce damping driving torque Tbd may be reduced to zero by not calculating a bounce speed Vb of the vehicle body and a bounce damping driving torque Tbd.

In the above-described third and fourth embodiments, a vehicle speed gain Ab is set to 1 when a vehicle speed V is less than or equal to the upper limit reference vehicle speed Vrh and is set to zero when a vehicle speed V exceeds the upper limit reference vehicle speed Vrh. The vehicle speed gain Ab may also be set to zero even when a vehicle speed V is less than the lower limit reference vehicle speed VrI. In that case, pitch vibration of the vehicle in the vehicle speed range lower than the lower limit reference vehicle speed VrI can be reduced as compared to the third and fourth embodiments.

In the above-described fourth embodiment, as in the first embodiment, the vehicle speed gain Ap for pitch damping is set to zero when a vehicle speed V is equal to or lower than the upper limit reference vehicle speed Vrh. However, as in the second embodiment, the vehicle speed gain Ap in the fourth embodiment may be set to zero when a vehicle speed V is equal to or higher than the lower limit reference vehicle speed VrI and equal to or lower than the upper limit reference vehicle speed Vrh. In that case, as in the second embodiment, pitch vibration of the vehicle body in the low vehicle speed range where a vehicle speed V is lower than the lower limit reference vehicle speed VrI can be reduced as compared to the first embodiment.

What is claimed is:

1. A vibration damping control apparatus for a vehicle applied to a vehicle including a driving force generating device that generates a driving force of the vehicle and an electronic control unit (ECU) that controls the driving force generating device, the driving force generating device being one of an engine, an electric motor, and a fuel cell, and the ECU being configured to calculate a driver-requiring driving force based on a driving operation amount of a driver, calculate a pitch angular velocity of a vehicle body, calculate a pitch damping driving force for reducing a pitch vibration of the vehicle body based on the pitch angular velocity, and control the driving force generating device based on a sum of the driver-requiring driving force and the pitch damping driving force, wherein the ECU stores a vehicle speed corresponding to a phase difference of −180° in a relationship between a phase difference and a vehicle speed as an upper limit reference vehicle speed, the relationship being derived by obtaining a phase characteristic of a wheelbase filter function with a wheelbase and a vehicle speed of the vehicle as variables for various vehicle speeds and obtaining, based on the phase characteristic, a relationship between the phase difference of vertical displacements of the vehicle body at positions of front and rear wheels and a vehicle speed with respect to a pitch resonance frequency of the vehicle, the ECU is configured to reduce the pitch damping driving force when a vehicle speed is equal to or lower than the upper limit reference vehicle speed.

2. The vibration damping control apparatus for a vehicle according to claim 1, wherein the ECU stores a vehicle speed corresponding to a phase that is smaller than −180° by a preset value in the relationship between a phase difference and a vehicle speed as a lower limit reference vehicle speed, and is configured to reduce the pitch damping driving force for correction when a vehicle speed is equal to or higher than the lower limit reference vehicle speed and is equal to or lower than the upper limit reference vehicle speed.

3. The vibration damping control apparatus for a vehicle according to claim 1, wherein the ECU is configured to reduce the pitch damping driving force for correction to zero.

4. A vibration damping control apparatus for a vehicle applied to a vehicle including a driving force generating device that generates a driving force of the vehicle and an electronic control unit (ECU) that controls the driving force generating device, the driving force generating device being one of an engine, an electric motor, and a fuel cell, and the ECU being configured to calculate a driver-requiring driving force based on a driving operation amount of a driver, calculate a pitch angular velocity of a vehicle body, calculate a pitch damping driving force for reducing a pitch vibration of the vehicle body based on the pitch angular velocity, calculate a bounce velocity of the vehicle body, calculate a bounce damping driving force for reducing a bounce vibration of the vehicle body based on the bounce velocity, and control the driving force generating device based on a sum of the driver-requiring driving force, the pitch damping driving force and the bounce damping driving force, wherein the ECU stores a vehicle speed corresponding to a phase difference of −180° in a relationship between a phase difference and a vehicle speed as an upper limit reference vehicle speed, the relationship being derived by obtaining a phase characteristic of a wheelbase filter function with a wheelbase and a vehicle speed of the vehicle as variables for various vehicle speeds and obtaining, based on the phase characteristic, a relationship between the phase difference of vertical displacements of the vehicle body at positions of front and rear wheels and a vehicle speed with respect to a pitch resonance frequency of the vehicle, the ECU is configured to increase the bounce damping driving force when a vehicle speed is equal to or lower than the upper limit reference vehicle speed.

5. The vibration damping control apparatus for a vehicle according to claim 4, wherein the ECU is configured to reduce the pitch damping driving force for correction when a vehicle speed is equal to or lower than the upper limit reference vehicle speed.

6. The vibration damping control apparatus for a vehicle according to claim 5, wherein the ECU stores a vehicle speed corresponding to a phase that is smaller than −180° by a preset value in the relationship between a phase difference and a vehicle speed as a lower limit reference vehicle speed, and is configured to reduce the pitch damping driving force for correction when a vehicle speed is equal to or higher than the lower limit reference vehicle speed and is equal to or lower than the upper limit reference vehicle speed.

7. The vibration damping control apparatus for a vehicle according to claim 4, wherein the ECU is configured to control the bounce damping driving force to zero when a vehicle speed is higher than the upper limit reference vehicle speed and to increase the bounce damping driving force for correction to a value larger than zero when a vehicle speed is equal to or lower than the upper limit reference vehicle speed.

* * * * *